Aug. 30, 1927.
G. J. PROCKNOW
1,640,517
SAW GUARD
Filed April 17, 1924
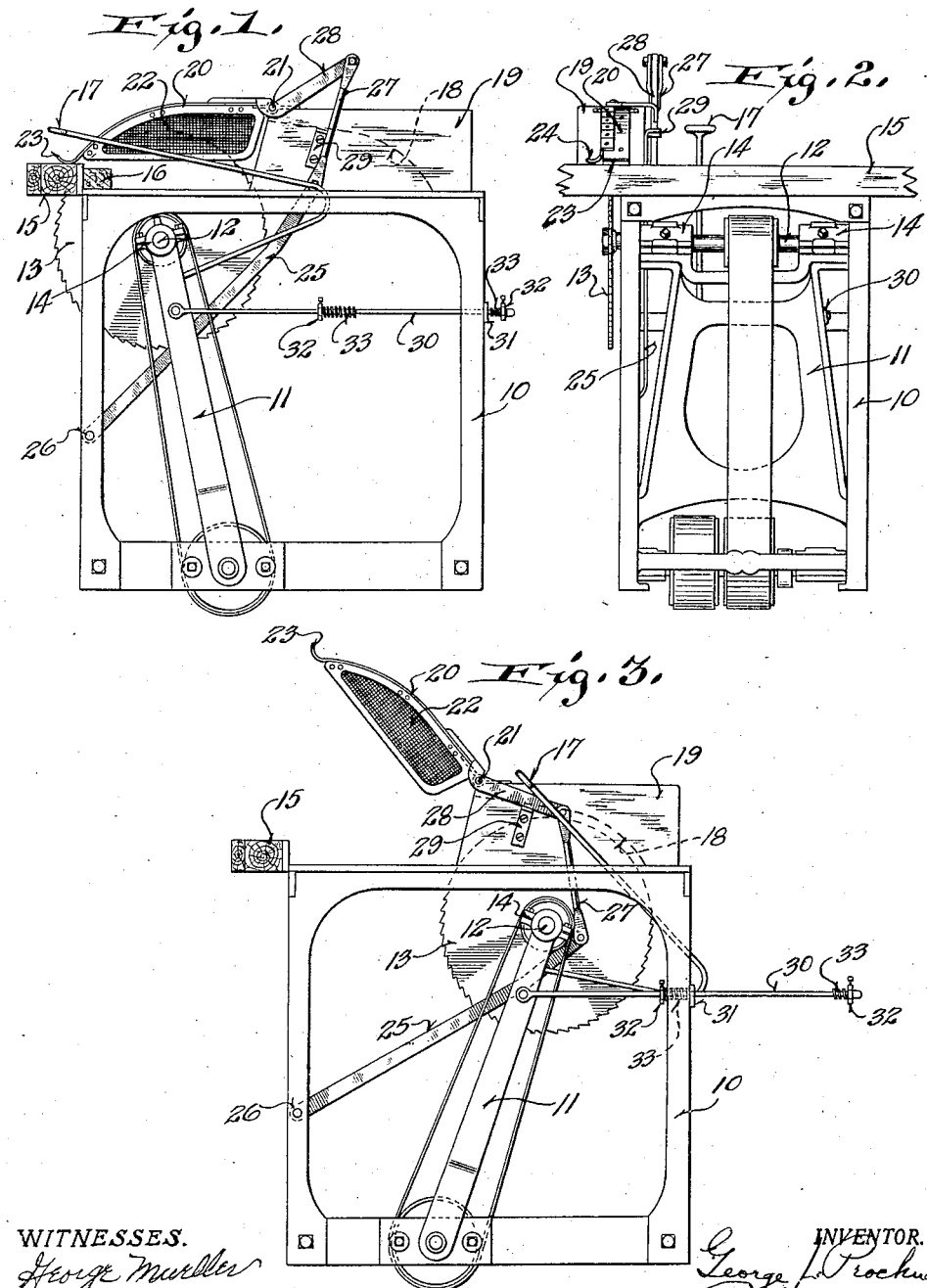

Patented Aug. 30, 1927.

1,640,517

UNITED STATES PATENT OFFICE.

GEORGE J. PROCKNOW, OF OSHKOSH, WISCONSIN, ASSIGNOR TO PAINE LUMBER COMPANY, LTD., OF OSHKOSH, WISCONSIN, A CORPORATION OF WISCONSIN.

SAW GUARD.

Application filed April 17, 1924. Serial No. 707,148.

The invention relates to saw guards, more particularly for traverse saws.

The object of the invention is to provide a saw guard which will cover a swinging circular saw as it is moved forwardly into the work, and which will be moved upwardly to permit free manipulation of the work when the saw is in retracted position.

The invention further consists in the several features hereinafter set forth and more particularly defined by the claim at the conclusion hereof.

In the drawings: Fig. 1 is a side view of a saw guard embodying the invention as applied to a swinging circular saw, and covering the saw in its forward position;

Fig. 2 is an end view of the saw guard in the operative position of Fig. 1, and

Fig. 3 is a side view similar to Fig. 1 but showing the guard raised and the saw in its retracted position.

In the drawings 10 indicates a saw table on which a swinging saw frame 11 is pivotally mounted at its lower end. At the upper end of the frame a belt-driven arbor 12 carrying a circular saw 13 is journalled in bearings 14. At its forward edge the table 10 is provided with a stop 15 against which the work 16 is placed, and the saw is moved forwardly against the work by a handle 17 secured to the swinging frame.

In its retracted position the saw rotates within a recess 18 cut into a wooden protecting block 19 secured to the top of the saw table, and as the saw is moved forwardly out of the recess and towards the work, a guard 20 pivoted on a hinge 21 fastened to the block 19 moves downwardly over the saw.

The guard 20 is formed of a narrow sheet metal frame having screened sides 22. A curved lip 23 is provided at the forward edge of the frame to engage the stop 15 when the guard is swung to its lower position, and when the work is higher than the stop, a curved lip 24 at the side of the guard is adapted to rest on the work.

A lever 25 is pivoted on a pin 26 secured to the forward part of the saw table and extends rearwardly and upwardly through the arcuate path of one of the bearings 14 on the pivoted saw frame 11. At its upper end the lever is connected by a link 27 to an arm 28 secured to and extending rearwardly of the saw guard. An angle clip 29 fastened to the side of the wooden block 19 forms a stop limiting the downward movement of the arm 28.

The saw frame 11 has a rod 30 pivoted to it and extending rearwardly through a plate 31 secured to the saw table. Adjustable stop collars 32 are fastened on the rod and springs 33 placed over the rod between the plate 31 and the collars form resilient stops for the saw frame in its extreme positions.

As the saw frame is moved rearwardly it bears against the lever 25 and moves it downwardly to elevate the saw guard through its linkage connection therewith, the arm 28 on the saw guard reaching its abutment against the stop angle 29. In this position, the work on the saw table may be moved by the operator without interference and without exposure to the saw, since the saw is then rotating within the recess 18 in the block 19.

While the saw is emerging from the block and the lever 25 is being released from its engagement with the arbor bearing 14, the guard swings downwardly by its weight against the stop 15, or the work, as the case may be, and remains there while the saw is moved forwardly into the work.

The invention provides a saw guard construction which affords protection to the operator during both the manipulation and cutting of the work, without causing interference during any of the several operations.

What I claim as new and desire to secure by Letters Patent is:

The combination with a saw table and a swinging saw frame having a saw rotatably mounted thereon, a stationary saw guard mounted on said table and enclosing the saw in its retracted position, a movable saw guard pivotally mounted at the forward end of said stationary saw guard and therewith forming an enclosure for the swinging saw, a lever secured to said movable saw guard and extending rearwardly therefrom, a lever pivotally mounted at the forward portion of said table and extending rearwardly and upwardly therefrom, and a link connecting the free ends of said levers, said last-named lever being adapted to be depressed by said saw frame on its rearward movement to lift said movable saw guard away from the work.

In testimony whereof I affix my signature.

GEORGE J. PROCKNOW.